United States Patent
Paterour et al.

(10) Patent No.: US 12,549,366 B2
(45) Date of Patent: Feb. 10, 2026

(54) IPCON MCDATA SESSION ESTABLISHMENT METHOD

(71) Applicant: AIRBUS DS SLC, Elancourt (FR)

(72) Inventors: Olivier Paterour, Elancourt (FR); François Piroard, Elancourt (FR)

(73) Assignee: AIRBUS DS SLC, Elancourt (FR)

( * ) Notice: Subject to any disclaimer, the term of this patent is extended or adjusted under 35 U.S.C. 154(b) by 122 days.

(21) Appl. No.: 18/470,079

(22) Filed: Sep. 19, 2023

(65) Prior Publication Data
US 2024/0097903 A1    Mar. 21, 2024

(51) Int. Cl.
*H04L 9/32* (2006.01)
*H04L 9/40* (2022.01)
*H04W 76/10* (2018.01)

(52) U.S. Cl.
CPC .......... *H04L 9/321* (2013.01); *H04L 63/0428* (2013.01); *H04W 76/10* (2018.02)

(58) Field of Classification Search
CPC .. H04W 76/10; H04L 63/0428; H04L 63/164; H04L 9/321
USPC .......................................................... 713/161
See application file for complete search history.

(56) References Cited

U.S. PATENT DOCUMENTS

| | | | | |
|---|---|---|---|---|
| 8,117,454 | B2* | 2/2012 | Forsberg | H04W 12/04 455/410 |
| 8,699,709 | B2* | 4/2014 | Thomas | H04W 12/06 713/168 |
| 9,526,027 | B2* | 12/2016 | Gupta | H04L 47/125 |
| 11,606,769 | B2* | 3/2023 | Issakov | H04W 8/245 |
| 2023/0044847 | A1* | 2/2023 | Palanigounder | H04W 12/06 |

OTHER PUBLICATIONS

Search Report as issued in French Patent Application No. 2209495, dated Apr. 19, 2023.
(Continued)

*Primary Examiner* — Amare F Tabor
(74) *Attorney, Agent, or Firm* — Pillsbury Winthrop Shaw Pittman LLP

(57) ABSTRACT

A method for establishing an IPCON Mission Critical Data Internet Protocol Connectivity MCData session in a communications network according to the 3GPP MCS 3rd Generation Partnership Program Mission Critical System standard. The network includes an emitting MCData entity, a destination MCData entity and an MCData transport service connected to the emitting and destination MCData entities. The method includes obtaining, from the emitting MCData entity, a DPPK MCData Payload Protection Key and a DPPK-ID MCData Payload Protection Key Identifier, transmitting a SIP-INVITE message comprising the DPPK key and the DPPK-IK key identifier, from the emitting MCData entity to the destination MCData entity via the MCData transport service, authenticating the message, by the destination MCData entity, and determining the DPPK key and the DPPK-ID key identifier, by the destination MCData entity, and establishing an IP tunnel between the emitting MCData entity and the destination MCData entity.

7 Claims, 2 Drawing Sheets

(56) References Cited

OTHER PUBLICATIONS

3rd Generation Partnership Project; Technical Specification Group Services and System Aspects; Security of the mission critical service; (Release 14), 3GPP Standard; Technical Specification; 3GPP TS 33.180, 3rd Generation Partnership Project (3GPP), vol. SA WG3, No. V14.0.0, Jun. 2017, XP051298598, pp. 1-118.
3rd Generation Partnership Project; Technical Specification Group Core Network and Terminals; Mission Critical Data (MCData) media plane control; Protocol specification (Release 17), 3GPP Standard; Technical Specification; 3GPP TS 24.582, 3rd Generation Partnership Project (3GPP), vol. CT WGI, No. V17.2.0, Jun. 2022, XP052183246, pp. 1-50, retrieved from the Internet: URL:https://ftp.3gpp.org/Specs/archive/24_series/24.582/24582-h20.zip24582-h20.docx, [retrieved on Jun. 24, 2022].

\* cited by examiner

IPCON MCDATA SESSION ESTABLISHMENT METHOD

CROSS-REFERENCE TO RELATED APPLICATIONS

This application claims priority to French Patent Application No. 2209495, filed Sep. 20, 2022, the entire content of which is incorporated herein by reference in its entirety.

FIELD

The technical field of the invention is that of telecommunications.

The present invention relates to a method for establishing an MCData Internet Protocol Connectivity (IPCON) session and in particular a method for establishing an IPCON session in a communication network according to the 3GPP MCS "3rd Generation Partnership Program Mission-Critical System" standard.

BACKGROUND

The PMR (Professional Mobile Radio) radiocommunication standards TETRAPOL®, TETRA® and P25® enable the implementation of secure professional networks. These narrowband networks are national or local area networks: they are implemented, for example, within an organisation such as a company, or within a country, for example, for communications between firefighters, law enforcement agencies, the military, etc.

These networks are evolving to support broadband exchanges. The 3GPP standard governing mobile networks of the "GSM" (Global System for Mobile Communications) type, in particular in their third, fourth and fifth generations, respectively called "3G", "4G" and "5G", and subsequent generations, and more particularly in deployments calling on critical communications services defined by the 3GPP called "MCS" (Mission Critical Services), enables these secure broadband exchanges. A 3G, 4G or 5G network implements 3G/4G/5G User Equipment (UE), a 3G/4G/5G radio access network (RAN) and a network core (3G/4G/5G). Deployments of broadband MCS services are of course not limited to 3G/4G/5G mobile networks, but also include deployments in fixed and mobile IP (Internet Protocol) networks, e.g. WLANs (Wide Local Area Network).

By "communication network according to the 3GPP MCS standard", it is meant a communication network compatible with the 3GPP MCS standard, and more particularly with the current version of 3GPP, version 17, and with subsequent versions incorporating all the characteristics of the invention.

In the 3GPP MCS standard, the following communication services are defined:
  MCPTT (Mission Critical Push To Talk), which enables voice communications,
  MCVideo, which enables video communications,
  MCData, which comprises three sub-services:
    SDS (Short Data Service) and FD (File Distribution Service).
    FD (File Distribution),
    IPCON (IP Connectivity).

The MCData SDS service enables payload of variable size to be transported. The MCData SDS service covers status and messaging functions. The payload can be an extended text or message, a hyperlink allowing users to access linked and accessible content such as a large file, situational awareness data, location information or control instructions.

The MCData IPCON service relates to the sending of payload between two MCData clients. It should be emphasised that, unlike the MCData SDS service, the MCData IPCON service is a transport service that is agnostic to the nature of the application exchanges. The MCData IPCON service enables the exchange of IP data using the MCData transport service as an intermediary, and transports IP data to, for example, data hosts, servers etc. The data exchange is not limited to a single transaction.

FIG. 1 is a schematic representation of a system that can be used to implement the IPCON MCData service. MCData clients 220 enable bidirectional communication of IP 200 data with the support of the IP connectivity service, which thus constitutes a gateway to hosts 210 or data servers 210. The emitting MCData 220 client requests a quality of service requirement and associated communication priority from the MCData 230 transport service. The Internet Protocol (IP) tunnel 240 between the two MCData clients 220 is an IP routing tunnel for data 200, especially media data. Each of the two MCData clients 220 is connected 250 to the MCData transport service 230.

It should be noted that an MCData client, which supports IP connectivity capabilities, is able to prohibit incoming IP connectivity requests, either on demand, or by providing a list of excluded origins identified by the MCData identifier and, if possible, by the functional alias.

The current specifications, defined in 3GPP standard TS 23.282, for MCData IPCON communications include the establishment and deletion of an IP tunnel 240 between two MCData clients 220.

No security is currently provided for the IP tunnel between two MCData clients. Thus, at present, the security of the data 200 transported through the IP tunnel 240 is based on the data security applied by the application servers 210.

However, the data security applied by application servers 210 is sometimes not sufficient, or even totally absent. For the moment, no solution has been found as regards MCData IPCON communications in the technical specification documents TS 23.282 of the 3GPP standard dedicated to functional architecture and procedures, and TS 24.282 of the 3GPP stage 3 standard dedicated to protocol and implementation.

There is therefore a need to provide a method which complies with the 3GPP R17 specifications and provides security for MCData IPCON communications. In other words, security of the content to be transported end-to-end between MCData clients implementing the IP tunnel should be provided. In addition, this security should be both activatable and deactivatable.

The method should also enable media data management. The IP tunnel, established on the media plane between MCData IP clients, enables media data to be exchanged between external application entities. MCData IP clients should therefore be able to control access to this IP tunnel: this is done on the MCData control plane beforehand and on the media plane by securing the data transiting through this IP tunnel.

In order to ensure media data management, the method should be compatible with GRE in UDP tunnels, as recommended in 3GPP standard TS 24.582 relating to media data management in clause 13.4. GRE encapsulation in UDP is described in IETF document RFC 8086 "Internet Engineering Task Force Request for Comments: 8086". The GREin-UDP encapsulation format contains a UDP header and a GRE header. It should be noted that these header elements do not have to be altered by the method used to secure MCData IPCON communications.

Finally, MCData IPCON communications currently relate to point-to-point communications only. Thus, group MCData IPCON communications do not exist. A group can be defined as a virtual group gathering several user devices that can interact with each other once authorised by the communication network, for example authenticated to a group management server of the communication network, thus allowing access to the communication group.

Thus, the invention aims to provide a method for establishing secure end-to-end IPCON MCData communications, for both point-to-point and group communications.

SUMMARY

An aspect of the invention offers a solution to the problems discussed above, by defining a mechanism for generating, distributing and deriving keys for the MCData IPCON service, as well as a mechanism for encrypting MCData IPCON content.

An aspect of the invention relates to a method for establishing an MCData IPCON "Mission Critical Data IP Connectivity" session in a communication network according to the 3GPP MCS "3rd Generation Partnership Program Mission Critical System" standard, the network comprising:
  an emitting MCData entity;
  a destination MCData entity; and
  an MCData transport service connected to the emitting and destination MCData entities;
the method comprising:
  obtaining, by the emitting MCData entity, a DPPK "MCData Payload Protection Key" and a DPPK-ID "MCData Payload Protection Key Identifier";
  transmitting a SIP-INVITE message including the DPPK key and the DPPK-IK key identifier by the emitting MCData entity to the destination MCData entity via the MCData transport service;
  authenticating the message by the destination MCData entity;
  determining the DPPK key and the DPPK-ID key identifier, by the destination MCData entity and establishing an IP tunnel between the emitting MCData entity and the destination MCData entity.

By virtue of the invention, end-to-end security is ensured between two MCData entities in an IPCON communication. Thus, even if the content to be sent is not secured by the application servers when it is received by the emitting entity, the invention will make it possible to secure transmission of content between the emitting entity and the destination entity.

Further to the characteristics just discussed in the preceding paragraph, the method according to an aspect of the invention may have one or more additional characteristics from among the following, considered individually or according to any technically possible combinations:
  A method according to an aspect of the invention, wherein the emitting MCData entity is connected to an emitting application entity and the destination MCData entity is connected to at least one destination application entity, the method further comprising, the final steps of:
    Transmitting payload, by the emitting application entity, to the emitting MCData entity.
    Generating, by the emitting MCData entity, a data packet comprising:
      payload encrypted using the DPPK key and the DPPK-ID key identifier; and
      a header;
  Sending, by the emitting MCData entity, the generated data packet to the destination MCData entity via the IP tunnel established;
  Removing, by the destination MCData entity, the header of the data packet generated and decrypting the payload encrypted using the DPPK key and the DPPK-ID key identifier; and
  Transmitting, by the destination MCData entity, the payload decrypted to the at least one destination application entity.
A method according to an aspect of the invention, wherein:
  the IP tunnel is a GRE "Generic Routing Encapsulation" tunnel in the UDP "User Datagram Protocol"; and
  the header is a GRE and UDP type header.
A method according to an aspect of the invention further comprises the prior steps of:
  obtaining information of
    authorisation to establish an IPCON MCData session, configured with an MCData media plan, between the emitting MCData entity and the destination MCData entity; and
    the need to implement the method according to the invention; and
  implementing the MCData IPCON "Mission Critical Data IP Connectivity" session establishment method according to the invention when the MCData IPCON session establishment, configured with the MCData media plan, between the emitting MCData entity and the destination MCData entity is authorised and if the implementation of the method according to the invention is needed.
A method according to an aspect of the invention wherein:
  the method is a group IPCON MCData session establishment method;
  the emitting MCData entity is an MCData client belonging to an MCData group;
  the destination MCData entity is a set of MCData clients belonging to the same MCData group as the emitting MCData entity; and
  the DPPK key is a GMK (Group Master Key) key and the DPPK-ID key identifier is a GMK-ID (Group Master Key Identifier) key.
A method wherein:
  the method is a point-to-point IPCON MCData session establishment method;
  the emitting MCData entity and the destination MCData entity are MCData clients; and
  the DPPK key is a PCK (Private Call Key) and the DPPK-ID key identifier is a PCK-ID (Private Call Key Identifier) and the PCK key comprises encryption of the identity of the destination MCData entity;
  an initial step of obtaining, by the emitting MCData entity and the destination MCData entity, the encryption elements;
  the step of obtaining the PCK key and the PCK-ID key identifier, by the emitting MCData entity, consists in generating the PCK key and the PCK-ID identifier using the encryption elements obtained in the step;
  the SIP-INVITE message transmitted in the step by the emitting MCData entity to the destination MCData entity, comprises a MIKEY-SAKKE I-MESSAGE "Multimedia Internet KEYing-Sakai-Kasahara Key Encryption" container, the MIKEY-SAKKE I-MES-SAGE container comprising the DPPK key encrypted with an SAKKE encryption method; and the DPPK-ID key identifier; and determining the PCK key and the PCK-ID key identifier by the destination MCData entity is performed using the encryption elements obtained in the initial step.

Another aspect of the invention relates to a communication network according to the 3GPP MCS "3rd Generation Partnership Program Mission-Critical System" standard, the communication network comprising:
an emitting MCData entity;
a destination MCData entity;
an MCData transport service connected to the emitting and destination MCData entities;
the communication network being configured to implement the method according to the invention.

Further to the characteristics just discussed in the preceding paragraph, the communication network according to an aspect of the invention may have the following characteristic:
a network according to the invention in which the destination MCData entity is:
a set of MCData clients belonging to the same MCData group as the emitting MCData entity; or
an MCData client.

According to a third aspect of the invention, a computer program product comprising instructions which cause the system according to the invention to execute the method according to the invention is provided.

According to a fourth aspect of the invention, a non-transitory computer-readable medium, on which the computer program according to the invention is recorded, is provided.

The invention and its different applications will be better understood upon reading the following description and upon examining the accompanying figures.

BRIEF DESCRIPTION OF THE FIGURES

The figures are set forth by way of indicating and in no way limiting purposes of the invention.

DETAILED DESCRIPTION

Unless otherwise specified, a same element appearing on different figures has a single reference.

Figure 5:
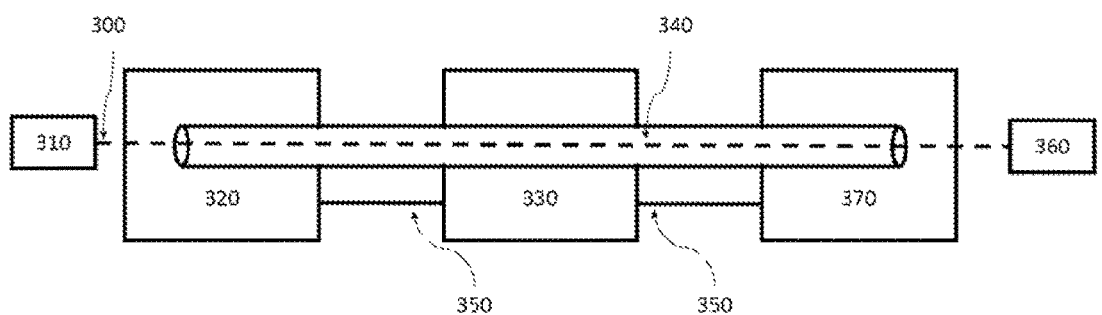
FIG. 5 shows a schematic representation of a system configured to implement the IPCON MCData service according to an embodiment of the invention.

FIG. 5 is a schematic representation of an IPCON "Mission Critical Data IP Connectivity" MCData session establishment method according to an embodiment of the invention. The emitting MCData entity 320 and the destination MCData entity 370 are connected 350 to the MCData transport service 330. The MCData transport service 330 comprises one or more MCData servers. An MCData server may include one or more processors and one or more memories that store machine executable instructions for carrying out the function(s) of the MCData server. The emitting MCData entity 320 is connected to an emitting application entity 310. The emitting application entity 310 is, for example, an emitting application server. The destination MCData entity 370 is connected to a destination application entity 360. The destination application entity 360 is, for example, a destination application server. The IP tunnel 340 enables IP routing of data 300, especially media data from the emitting application entity 310 to the destination application entity 360 via the MCData entities 320 and 370.

The communication network of FIG. 5 is configured to implement the MCData IPCON service. The emitting 320 and destination 370 MCData entities are interchangeable with each other, that is an MCData entity can be an emitting entity 320 in one period and a destination entity 370 in another period. Each of these MCData entities has an identity within the communication network. This identity makes it possible to identify the entity within the communication network. For example, the identity can be a unique identifier within the communication network.

Figure 1:
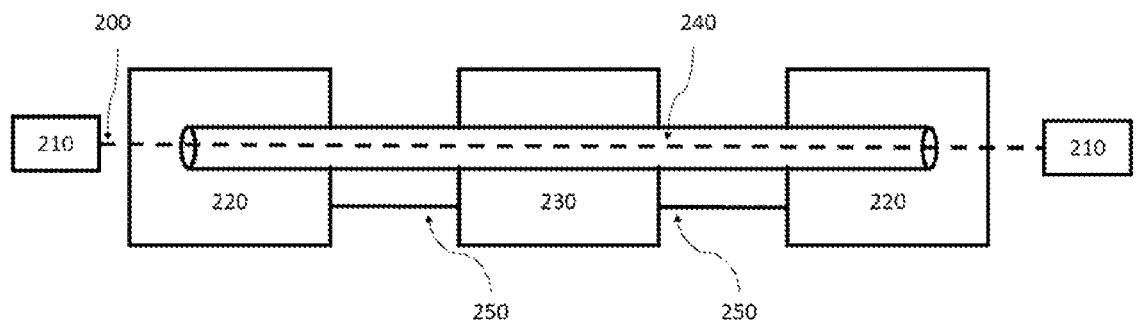
FIG. 1 shows a schematic representation of a system for implementing the IPCON MCData service of prior art.
Figure 2:
FIG. 2 is a block diagram illustrating the sequence of steps in the method according to an embodiment of the invention.

FIG. 2 is a block diagram illustrating the sequence of steps in the method according to an embodiment of the invention.

In a first step 20, the emitting MCData entity 320 obtains a DPPK "MCData Payload Protection Key" and a DPPK-ID "MCData Payload Protection Key Identifier". Obtaining the DPPK key can consist in receiving the DPPK key and the DPPK-ID identifier. Obtaining the DPPK key can also consist in generating the DPPK key using the encryption elements. It should be noted that the DPPK key is not a particular type of key. Indeed, the term DPPK encompasses the key types existing in MCData, for example a PCK "Private Call Key" and a GMK "Group Master Key", used for protection in the MCData method for point-to-point and group communications respectively. As a result, several DPPK keys can be used in a method 1 for establishing an IPCON MCData session, depending on the communication channel. Furthermore, although a PCK private key and a GMK key can both be used as the DPPK key to protect the MCData method in different channels, the PCK private key and the GMK key are not the same key and will not be used in the same channels.

The method 1 according to an embodiment of the invention comprises a second step of transmitting 30, by the emitting MCData entity 320 to the destination MCData entity 370 via the MCData transport service, a SIP-INVITE message comprising the DPPK key and the DPPK-IK key identifier.

Transmitting 30 is carried out according to the SDP "Session Description Protocol". SDP is a communication protocol for describing initialisation parameters of a flow broadcast session. SDP does not include media delivery. It is used by the emitting and destination entities to negotiate the media type, format and associated properties. Transmitting 30 is achieved by embedding an SDP load in the body of a SIP INVITE message. The SIP INVITE message is sent by the emitting MCData entity 320 to the destination MCData entity 370. The destination MCData entity 370 then replies whether or not it accepts the establishment of an IPCON MCData session with the emitting MCData entity 320.

In a third step 40, the destination MCData entity 370 authenticates the SIP-INVITE message. The purpose of authentication is to verify that the SIP-INVITE message actually comes from the emitting MCData entity and that it is not corrupted. Authentication can be facilitated by authentication procedures carried out prior to implementation of the method according to the invention. Thus, in this case, authentication may consist in verifying that the message has actually been sent by the emitting MC Data entity. Authentication can also involve verifying the signature of an element contained in the message. The validity of the signature can be determined by verifying that the identity of the emitting MCData entity 320 exists in the list of trusted identities of the destination MCData entity 370 and the integrity of the document.

The method 1 according to an embodiment of the invention includes a final step of determining 50 the DPPK key and the DPPK-ID key identifier, by the destination MCData entity 370.

Figure 3:
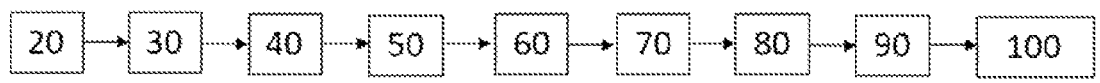
FIGS. 3 and 4 are block diagrams illustrating the sequence of steps in the method according to two alternatives to the invention.

FIG. 3 is a block diagram illustrating the sequence of steps in the method according to an alternative of the invention. In this alternative, the method further comprises final steps 60, 70, 80, 90 and 100. This alternative enables secure end-to-end data sending between two application entities. Each application entity is, for example, an application server. A first application entity 310 is connected to an emitting MCData entity 320 and a second application entity 360 is connected to a destination MCData entity 370.

In step 60, the emitting application entity 310 transmits payload to the emitting MCData entity 320. This payload may or may not be encrypted.

Then, in step 70, the transmitting MCData entity 320 generates a data packet comprising the payload encrypted using the DPPK key and the DPPK-ID key identifier and a header. Thus, prior to generation 70, the payload is encrypted. In order to perform encryption, a derivation of the DPPK key may be necessary. For example, the DPPK key is hashed by a key derivation function to produce an MCData Payload Cipher Key (DPCK) for the payload. An example of a protected data format compatible with the invention is described in clause 8.5.4.1 of the 3GPP standard TS 33.180 Technical Specifications.

Step 80 consists in sending the data packet 70 generated from the emitting MCData entity 320 to the destination MCData entity 370. In step 90, the destination MCData entity 370 then removes the header from the data packet generated in step 70 and decrypts the encrypted payload using the DPPK key and the DPPK-ID key identifier. Finally, the destination MCData entity 370 transmits the decrypted payload to the destination application entity 360 in a step 100. It should be noted that the MCData servers of the MCData transport service 330 provide transport between the emitting MCData entity 320 and the destination MCData entity 370. These MCData servers can especially use the header of the data packet generated in step 70 to identify the destination MCData entity 370.

In one alternative compatible with the alternative described above, the IP tunnel 340 is a GRE "Generic Routing Encapsulation" tunnel in the UDP "User Datagram Protocol" and the header is a GRE and UDP type header. The GRE in UDP tunnel is configured between the emitting MCData entity 320 and the destination MCData entity 370, with each MCData entity 320 and 370 acting as one end of the IP tunnel 340. MCData entities 320 and 370 are configured to send and receive GRE packets directly to each other. The MCData servers of the MCData 330 transport system located between these two MCData 320 and 370 entities will not open the encapsulated data packets. They will only refer to the headers surrounding the encapsulated packets in order to transmit them. Thus, this encapsulation makes it possible especially not to affect security of the encapsulated data packets.

Figure 4:

FIG. 4 is a block diagram illustrating the sequence of steps in the method according to one alternative of the invention. In this alternative, which is compatible with the preceding alternatives, the method further comprises preliminary steps 110 and 120. In step 110, the emitting MCData entity 320 and the destination MCData entity 370 obtain 110 MCData IPCON session establishment authorisation information, configured with an MCData media plan, between the emitting MCData entity and the destination MCData entity 370, and information relating to the need to set up a method ensuring the security of the data sent. The information relating to the need to set up the method ensuring security of the data sent can therefore be used to activate or deactivate set-up of the method, for example depending on the data security applied by the application servers.

The MCData IPCON service provides a media plan for the exchange of any type of IP data between IP applications. These IP applications may reside on hosts external to the 3GPP network connected by an IP interface to the MCData entity, or may be executed directly by the MCData entity. A media plan that can be used in the invention is detailed in technical specification document TS 24.582.

Information about the MCData IPCON session establishment authorisation and relating to the need to set up the method ensuring security of the data sent can be inserted into the profile document of the emitting and destination MCData entities.

Depending on this information, the method is implemented at step 120 or not. Thus, if the information authorises establishment of an IPCON MCData session, configured with an MCData media plan, between the emitting MCData entity 320 and the destination MCData entity 370 and confirms the need to set up the method ensuring security of the data sent, then the method according to the invention is implemented in a step 120.

In a first implementation mode, the method according to the invention is a group IPCON MCData session establishment method. The emitting MCData entity is an emitting MCData client 420 belonging to an MCData group 480, the destination MCData entity is a set of destination MCData clients 470 belonging to a same MCData group 480 as the emitting MCData client 420, the DPPK key is a GMK "Group Master Key" type key and the identifier of the DPPK-ID key is a GMK-ID "Group Master Key Identifier" type key.

In this first implementation mode, the GMK key and the GMK-ID key identifier are obtained in step 20. This obtaining consists in receiving the GMK key and the GMK-ID key identifier by the emitting MCData entity. The GMK key and the GMK-ID key identifier can be provided by a Group Master Server (GMS).

In step 30, transmitting the container is performed from an emitting MCData client 420 to the other members of the group, which are thus destination MCData clients 470.

Then, in step 40, each destination MCData client authenticates the SIP-INVITE message by verifying that the container actually originates from the client belonging to the same group. In this first implementation mode, authentication is facilitated by authentication procedures carried out prior to implementation of the method according to the invention. Thus, in this case, authentication may consist in verifying that the message has actually been sent by the emitting MC Data entity, for example by accessing a subelement of the group document which includes all information relating to the group. Finally, in step 50, the destination MCData client determines the GMK key and the GMK-ID key identifier. For example, the SIP-INVITE message may contain a group identifier, such as a "Uniform Resource Locator" URL address, which provides access to a group document containing the GMK and GMK ID.

Once the group communication session has been established, an emitting MCData client wishing to transmit a data packet to the other members of the group should encrypt this data packet. An example of encryption that can be used in the invention is that described in technical specification document TS 33.180, especially with a derivation of the GMK key as defined in clause 8.5.3 and a protected data format described in clause 8.5.4.1 in technical specification document TS 33.180, before adding the necessary headers to it. An example of a usable header is a GRE and UDP header. Then, optionally, the destination MCData clients 470 perform the reverse operation before transmitting the decrypted packet to the target data host.

Figure 6:
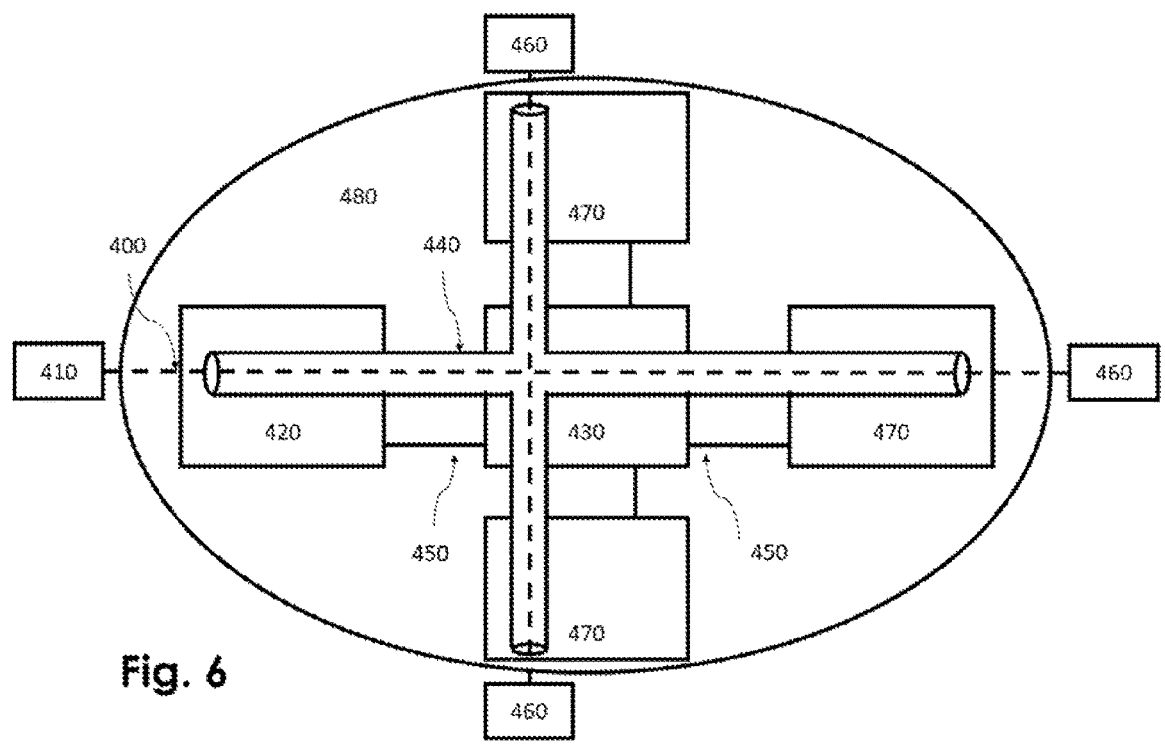
FIG. 6 shows a schematic representation of a system configured to implement the group IPCON MCData service according to one implementation mode of the invention.

FIG. 6 is a schematic representation of a system that may serve to implement this first implementation mode. The emitting MCData client 420 and the destination MCData clients 470 belong to the same MCData group 480. Each MCData client 420 and 470 is connected 450 to the MCData transport service 430. The MCData transport service 430 comprises one or more MCData servers. The MCData client 420 is connected to an emitting application entity 410. Each destination MCData client 470 is connected to a destination application entity 460. The IP tunnel 440 enables IP routing of data 400, especially media data, from the application entity 410 to the application entities 460.

In a second implementation mode, the method according to the invention is a point-to-point IPCON MCData session establishment method. The emitting MCData entity 320 and the destination MCData entity 370 are MCData clients. The DPPK key is a PCK "Private Call Key" type key and the DPPK-ID key identifier is of the PCK-ID "Private Call Key Identifier" type.

In the first step 10, emitting 320 and destination 370 MCData clients obtain encryption elements. These encryption elements enable the PCK key and PCK-ID identification to be obtained and determined. These encryption elements can be supplied by a KMS "Key Management Server". The encryption elements coming from the KMS server are, for example, the SSK "Secret Signing Key" private key, the PVT "Public Validation Token" public key or the KPAK "KMS Public Authentication Key".

In the second step 20, the emitting MCData client obtains a private key PCK and a private key identifier PCK-ID. This obtaining consists in generating the PCK private key and the PCK-ID private key identifier using the encryption elements obtained in step 10. In order to perform encryption, a derivation of the PCK key may be necessary. An example of a derivation usable in the invention is defined in clause 8.3 of technical specification document TS 33.180.

The PCK key obtained in step 20 comprises encryption of the identity of the destination MCData entity 370. Thus the PCK key, after extraction, makes it possible to obtain the destination MCData entity 370.

In the third step 30, the emitting MCData transmits the private key PCK and the private key identifier PCK-ID in the SIP-INVITE message. The SIP-INVITE message comprises a MIKEY-SAKKE I-MESSAGE "Multimedia Internet KEYing-Sakai-Kasahara Key Encryption" container, the MIKEY-SAKKE I-MESSAGE container comprising the DPPK key encrypted with a SAKKE encryption method; and the DPPK-ID key identifier.

The MIKEY-SAKKE I-MESSAGE container is especially used to transport the DPPK key. The DPPK key can, for example, be 16 bytes long. The DPPK key is encapsulated in the container with a SAKKE encryption method. An example of implementation of the MIKEY-SAKKE I-MESSAGE messages adapted to the implementation of the invention is defined in document IETF RFC 6509 "Internet Engineering Task Force Request for Comments: 6509".

Authentication of the SIP-INVITE message may consist in validating the signature of the SIP-INVITE message. Signing the SIP-INVITE message involves signing the container. The signed container enables the destination MCData client to authenticate the container by validating the signature. For example, the container is signed using a signature that authenticates origin of the container by the destination MCData client.

Transmitting the container is performed from an emitting MCData client to a destination MCData client. The MIKEY-SAKKE I-MESSAGE includes the private key PCK. An example of the possible structure of the MIKEY-SAKKE I-MESSAGE for this embodiment is described in appendix E.3 in technical specification document TS 33.180.

In the fourth step 40, the destination MCData client authenticates the container containing the MIKEY-SAKKE I-MESSAGE by validating the caller's signature.

In the fifth step 50, the destination MCData client determines the private key PCK and the private key identifier PCK-ID. Determination is performed by extraction using the encryption elements obtained in step 10.

Subsequent traffic on the IPCON MCData session established, that is content sent by an emitting application entity to another destination application entity, is encrypted by the emitting client MCData and decrypted by the destination MCData using the PCK key. An example of encryption and decryption usable to implement the invention is described in technical specification document TS 33.180, especially with a derivation of the PCK key as defined in clause 8.5.3 and a protected data format described in clause 8.5.4.1 in technical specification document TS 33.180, before adding the necessary headers thereto. This encrypted content is transported in the tunnel established between both MCData clients, for example a GRE in UDP tunnel. So, after encrypting the content received from the emitting application entity, the emitting MCData client adds a header, for example a GRE and UDP header, before transmitting the data packet to the destination MCData client, which removes these added headers before decrypting the content and then transmitting the content decrypted to the destination application entity.

It will be appreciated that the various embodiments and aspects of the invention described previously are combinable according to any technically permissible combinations.

Embodiments of the subject matter and the operations and the various elements (server, gateway, . . . ) described in this specification can be implemented in digital electronic circuitry, and/or in computer software, and/or firmware, or and/or hardware, including the structures disclosed in this specification and their structural equivalents, or in combinations of one or more of them. Embodiments of the subject matter described in this specification can be implemented, e.g., as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. The different characteristics described and/or claimed may be beneficially combined. Their presence in the description or in the different dependent claims do not exclude this possibility. The reference signs cannot be understood as limiting the scope of the invention.

The articles "a" and "an" may be employed in connection with various elements and components of processes or structures described herein. This is merely for convenience and to give a general sense of the processes or structures. Such a description includes "one or at least one" of the elements or components. Moreover, as used herein, the singular articles also include a description of a plurality of elements or components, unless it is apparent from a specific context that the plural is excluded.

The invention claimed is:

1. A method for establishing a Mission Critical Data (MCData) Internet Protocol Connectivity (IPCON) session in a communications network according to the 3rd Generation Partnership Program Mission Critical System (3GPP MCS) standard, the network comprising:
   an emitting MCData entity connected to an emitting application entity;
   a destination MCData entity connected to a destination application entity, and
   an MCData transport service connected to the emitting and destination MCData entities;
the method comprising:
   obtaining, by the emitting MCData entity, a MCData Payload Protection Key (DPPK) and a MCData Payload Protection Key Identifier (DPPK-ID);
   transmitting, by the emitting MCData entity to the destination MCData entity via the MCData transport service, a Session Initiation Protocol INVITE (SIP-INVITE) message comprising the DPPK and the DPPK-ID;
   authenticating, by the destination MCData entity, the SIP-INVITE message, and determining, by the destination MCData entity, the DPPK and the DPPK-ID and establishing a Generic Routing Encapsulation (GRE) tunnel between the emitting MCData entity and the destination MCData entity, the GRE tunnel being established in a User Datagram Protocol (UDP), transmitting, by the emitting MCData entity, a payload to the emitting MCData entity,
   generating, by the emitting MCData entity, a data packet comprising
      the payload encrypted using the DPPK and the DPPK-ID identifier; and
      a GRE and UDP type header;
   sending, by the emitting MCData entity, the data packet generated to the destination MCData entity via the GRE tunnel established,
   removing, by the destination MCData entity, the header of the data packet generated and decrypting the encrypted payload using the DPPK and the DPPK-ID, and
   transmitting, by the destination MCData entity, the payload decrypted to the destination application entity.

2. The method according to claim 1, further comprising prior steps of:
  obtaining information of:
    authorization to establish an IPCON MCData session, configured with an MCData media plan, between the emitting MCData entity and the destination MCData entity, and
    the need to implement the method; and
  implementing the method, when the establishment of IPCON MCData session, configured with the MCData media plan, between the emitting MCData entity and the destination MCData entity is authorized, and when the implementation of the method is needed.

3. The method according to claim 1, wherein:
  said method is a group IPCON MCData session establishment method;
  the emitting MCData entity is an MCData client belonging to an MCData group;
  the destination MCData entity is a set of MCData clients belonging to a same MCData group as the emitting MCData entity; and
  the DPPK is a Group Master Key (GMK) and the DPPK-ID is a Group Master Key Identifier (GMK-ID).

4. The method according to claim 1, wherein:
  said method is a point-to-point IPCON MCData session establishment method;
  the emitting MCData entity and the destination MCData entity are MCData clients and
  the DPPK is a Private Call Key (PCK) type key, the DPPK-ID is of the Private Call Key Identifier (PCK-ID) type and the PCK comprises encryption of the identity of the destination MCData entity;
  an initial step of obtaining, by the emitting MCData entity and the destination MCData entity, the encryption elements;
  obtaining in step, by the emitting MCData entity, the PCK and the PCK-ID consists in generating the PCK and the PCK-ID using the encryption elements obtained in step;
  the SIP-INVITE message transmitted by the emitting MCData entity to the destination MCData entity, comprises a Multimedia Internet KEYing-Sakai-Kasahara Key Encryption (MIKEY-SAKKE I-MESSAGE) container the MIKEY-SAKKE I-MESSAGE container comprising the DPPK encrypted with a Sakai-Kasahara Key Encryption (SAKKE) encryption method; and the DPPK ID; and
  determining the PCK and the PCK-ID by the destination MCData entity is performed using the obtained encryption elements.

5. A communication network according to the 3GPP MCS 3rd Generation Partnership Program Mission-Critical System standard, the communication network comprising:
  an emitting MCData entity;
  a destination MCData entity, and
  an MCData transport service connected to the emitting and destination MCData entities,
the communication network being configured to implement the method according to claim 1.

6. The network according to claim 5, wherein the destination MCData entity is:
  a set of MCData clients belonging to the same MCData group as the emitting MCData entity, or
  an MCData client.

7. A non-transitory computer-readable medium comprising machine executable instructions which cause the network to execute the steps of the method of claim 1.

* * * * *